United States Patent [19]
Kurelek et al.

[11] 3,868,982
[45] Mar. 4, 1975

[54] METHOD OF HARVESTING AND ACCUMULATING TREES

[75] Inventors: John Kurelek, Brantford; Victor E. Locker, St. George, Ontario, both of Canada

[73] Assignee: Koehring Company, Milwaukee, Wis.

[22] Filed: Aug. 23, 1973

[21] Appl. No.: 391,015

Related U.S. Application Data

[62] Division of Ser. No. 315,564, Dec. 15, 1972, Pat. No. 3,797,541.

[52] U.S. Cl. .................................... 144/309 AC
[51] Int. Cl. ............................... A01g 23/00
[58] Field of Search .... 144/2 Z, 3 D, 34 R, 309 AC

[56] References Cited
UNITED STATES PATENTS

| | | | |
|---|---|---|---|
| 3,498,347 | 3/1970 | Vit | 144/3 D |
| 3,547,168 | 12/1970 | Busch et al. | 144/3 D |
| 3,590,760 | 7/1971 | Boyd et al. | 144/3 D |
| 3,708,000 | 1/1973 | Duffty et al. | 144/3 D |
| 3,763,905 | 10/1973 | Hamilton et al. | 144/3 D |

*Primary Examiner*—Gerald A. Dost
*Attorney, Agent, or Firm*—Andrew J. Beck

[57] ABSTRACT

A tree harvesting machine of the articulated type having a boom mounted tree-processing means at its front end and a felled tree accumulating box at its rear end. The tree-processing means is selectively rotatable on the boom and comprises selectively operable releasable gripping means, severing means, propelling means and delimbing means. The accumulating box comprises an upwardly tilted trough open at its front end and log direction means in the form of a downwardly sloped ledge are provided adjacent the open end of the trough. A tailgate is provided at the rear end of the trough. The forward end of the box is upwardly movable by hydraulic cylinders to increase trough tilt during unloading. In the method of operation, a standing tree is grasped by the gripping means, severed from its trunk while upright, tipped forwardly to felled position by rotation of the gripping means so that its severed or butt end faces the box, and moved axially rearwardly and upwardly by the propelling means over the log directing ledge near the box, while the limbs are simultaneously removed by the delimbing means. When the center of gravity of that portion of the severed tree which is to be loaded in the box has moved past the ledge, the severing means are operated to cut off the said portion of the tree which portion tips over the ledge and falls into the box. The machine and method are usable to harvest entire trees with only the upper end being topped. Or, a tree may be cut into desired lengths as it is moved by the propelling means.

14 Claims, 9 Drawing Figures

METHOD OF HARVESTING AND ACCUMULATING TREES

REFERENCE TO RELATED CO-PENDING APPLICATION

This is a divisional application from the U.S. patent application Ser. No. 315,564, filed Dec. 15, 1972 and entitled "Machine and Method for Harvesting and Accumulating Trees" issued Mar. 19, 1974 as U.S. Pat. No. 3,797,541.

BACKGROUND OF THE INVENTION

1. Field of Use

This invention relates generally to a method for harvesting and accumulating trees. In particular, it relates to an improved mobile machine having processing means for gripping, severing, propelling and delimbing a tree and for properly loading the severed logs in an accumulating box on the machine by means of log directing means associated with the box.

2. Description of Prior Art

A wide variety of types of apparatus and methods are known and employed in harvesting trees. In some cases, a tree is felled, separate apparatus is used to delimb it, and a separate loader is employed to load the delimbed tree onto a vehicle for transport. In other instances, tree harvesting machines are provided which sequentially perform a series of tree harvesting operations. For example, U.S. Pat. No. 3,557,849, issued Jan. 26, 1971 to Martinson for "Tree Harvester," and assigned to the same assignee as the present application, discloses a tree harvesting machine of the articulated vehicle type which is equipped with suitable means for gripping a tree, severing it, raising it vertically into a position wherein it is delimbed, severing it into logs of appropriate length, and moving the logs to a transport unit at the rear of the vehicle. In this and similar tree harvesting machines it is contemplated that the severed tree be cut into logs of limited length and no provision is made to handle long logs on the order, for example, of up to 35 feet length. Such prior art machines, therefore, are unable to produce long wood for forwarding to the roadside in large load sizes. Thus, such known machines are unable to take advantage of the best economical gain which is available in tree harvesting. Heretofore, in order to harvest long wood it was necessary to fell the tree, to use long stroke or traveling delimbing devices, and to further handle the logs, as by loaders, from the processing position for storage and further forwarding. Unfortunately, long stroke or traveling delimbing devices require guides, tracks or arms and are difficult to perfect as regards weight, maintenance requirements, control and operation. Furthermore, the time intervals involved between tree cutting, tree processing and loading significantly affected productivity and economics.

It is known in the tree harvesting art that forwarding of large loads of long wood in typical long wood terrain is best done by carrying the load on a short, articulated vehicle wherein the vehicle is about as long as the log or tree and wherein the load extends beyond the ends of the articulated vehicle. It is also known that a preferred way to carry such a load on such a vehicle is to place the heavier butt ends of the trees or logs toward the rear of the vehicle chassis and to have the lighter top ends of the long wood pointed forward and upward over the vehicle cab and other machinery on the front of the vehicle chassis. This allows for desired weight distribution characterisitics and, if the load is supported in a cradle or trough connected only to the rear chassis, clearance for oscillation and articulation between the cab and other front chassis components can be had. However, while it is preferable to transport or carry the load to roadside in the manner described, it is difficult to self-load such a vehicle and a separate loader was heretofore required, detracting from economical advantages.

SUMMARY OF THE PRESENT INVENTION

The present invention relates generally to a tree harvesting method which utilizes a vehicle having a tree processing means at one end and a trough-like log accumulating box at its other end, with log directing means in the form of a ledge located at the front end of the box and so positioned as to tip a falling log or tree by force of gravity into the box.

The machine tree processing means are rotatably mounted on a boom and comprise tree gripping means, tree severing means, tree propelling means, and tree delimbing means. The trough is upwardly tilted in the direction of the tree processing means, open at its upper end and closable at its lower end by a tailgate. The log directing means take the form of a ledge located adjacent the open end of the trough on one or both sides thereof and downwardly sloped theretoward. The vehicle for practicing the method takes the form of a self-propelled vehicle having articulately connected front and rear units, with the boom mounted on the front unit, with the box mounted on the rear unit, and with the box trough tilted upwardly toward the vehicle front. In another embodiment, the box is further tiltable upwardly to facilitate discharge of a load of logs therefrom.

The method of harvesting trees in accordance with the invention contemplates the step of providing an accumulating box and tree directing means and the step of releasing a log over the log directing means with its center of gravity there past so that the log tips over the directing means and into proper position in the box by force of gravity. In more specific aspects of the method, a tree to be harvested is gripped, severed from its stump while upright, rotated forwardly to felled position wherein its severed or butt end faces the box, propelled rearwardly so that its butt end moves over the tree directing means while the tree is being simultaneously delimbed, and severed again when the center of gravity of the portion of the tree to be loaded in the box has moved past the directing means so as to enable the said portion of the tree to tip over the directing means and fall by gravity into proper position in the trough of the box.

The design of the accumulating box is such as to enable the logs to fall thereinto under the force of gravity after tipping over the log directing means in properly aligned position without the need for further propulsion and with the top of the log or tree extending upwardly in a clear position. The design of the box also enables simple and economical unloading. Furthermore, the method in accordance with the invention permits the use of a minimum number of processing machines, carry out various processing steps such as limbing and loading simultaneously, and provide for automatic alignment of the load. The method in accordance with the invention is particularly well suited for use in harvesting usable logs on the order of 35 feet long, but could be adapted to handle log lengths on the order of 16–60 feet, for example. The machine and method are also adaptable to handle tree heights on the order of 30 to 120 feet, or more, while cutting them into shorter lengths during the processing operation. The relationship of the front and rear chassis (whether or not angled, oscillated or both) does not prevent feeding of logs over the directing means.

These and other objects and advantages of the present invention will appear hereinafter as this disclosure progresses, reference being had to the accompanying drawings.

DESCRIPTION OF PREFERRED EMBODIMENTS

Figure 8:
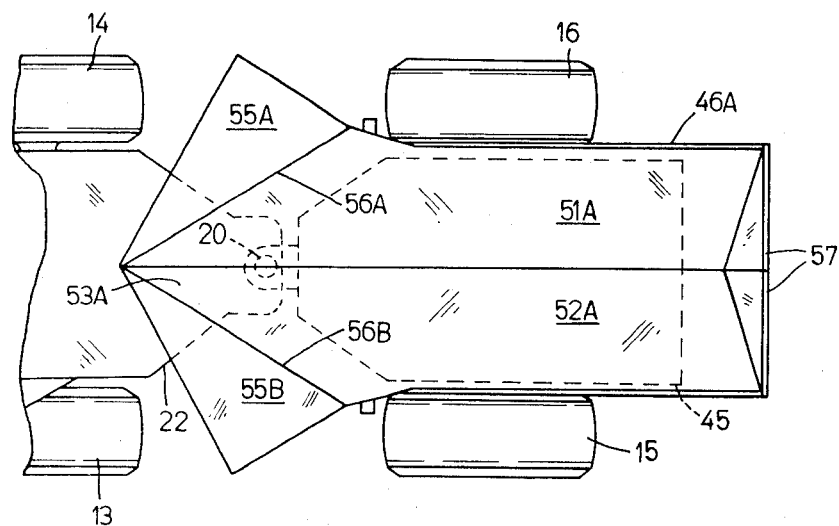
FIG. 8 is a top plan view of the box portion of the machine shown in FIG. 7.
Figure 7:
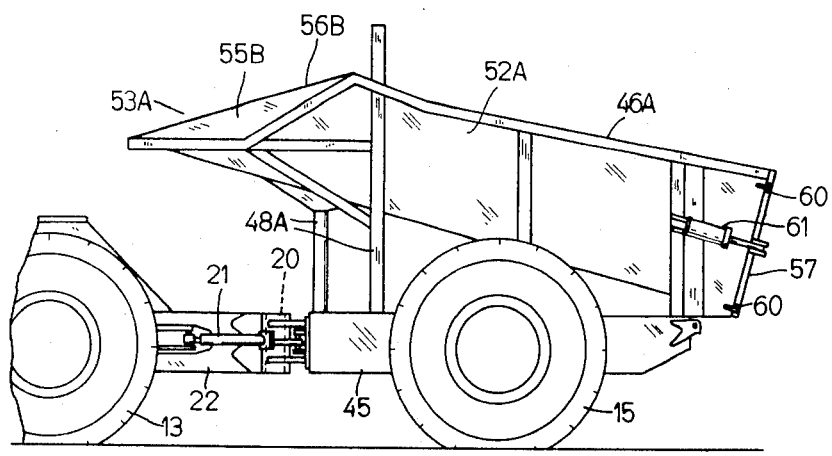
FIG. 7 is a side elevational view of the box portion of a second embodiment of a tree harvesting machine in accordance with the invention.
Figure 9:
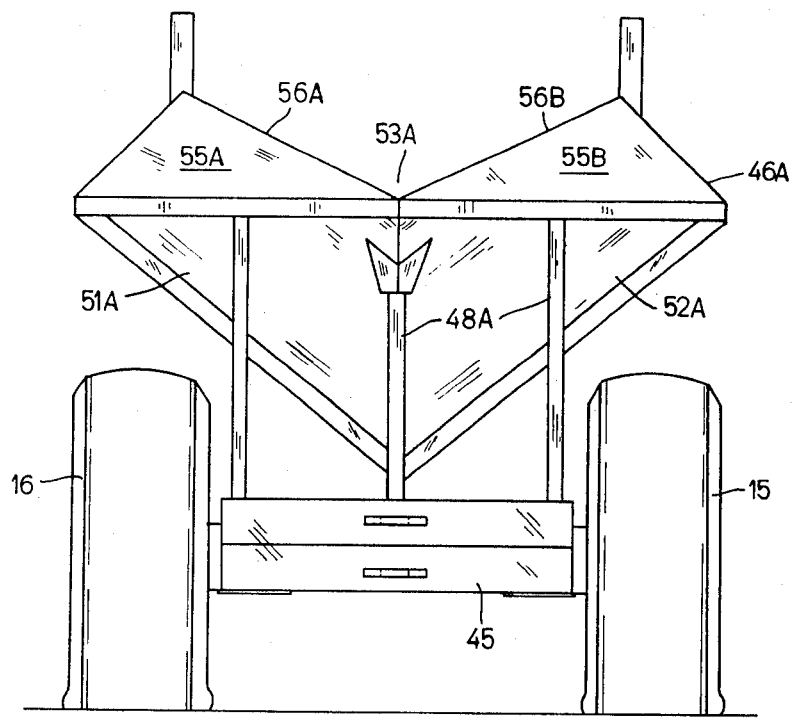
FIG. 9 is an elevational view of the front end of the box portion of the machine shown in FIGS. 7 and 8.

FIGS. 1 through 6 disclose one preferred embodiment of a tree harvesting machine in accordance with the present invention. FIGS. 7, 8 and 9 disclose the box portion of another embodiment of a tree harvesting machine in accordance with the present invention.

FIRST EMBODIMENT

Referring to FIGS. 1 through 6, one embodiment of a tree harvesting machine usable with the invention takes the form of a self-propelled articulated vehicle 10 comprising a front unit 11 and a rear unit 12 pivotally connected to the front unit for articulated movement about a vertical pivot axis 20.

Figure 2:
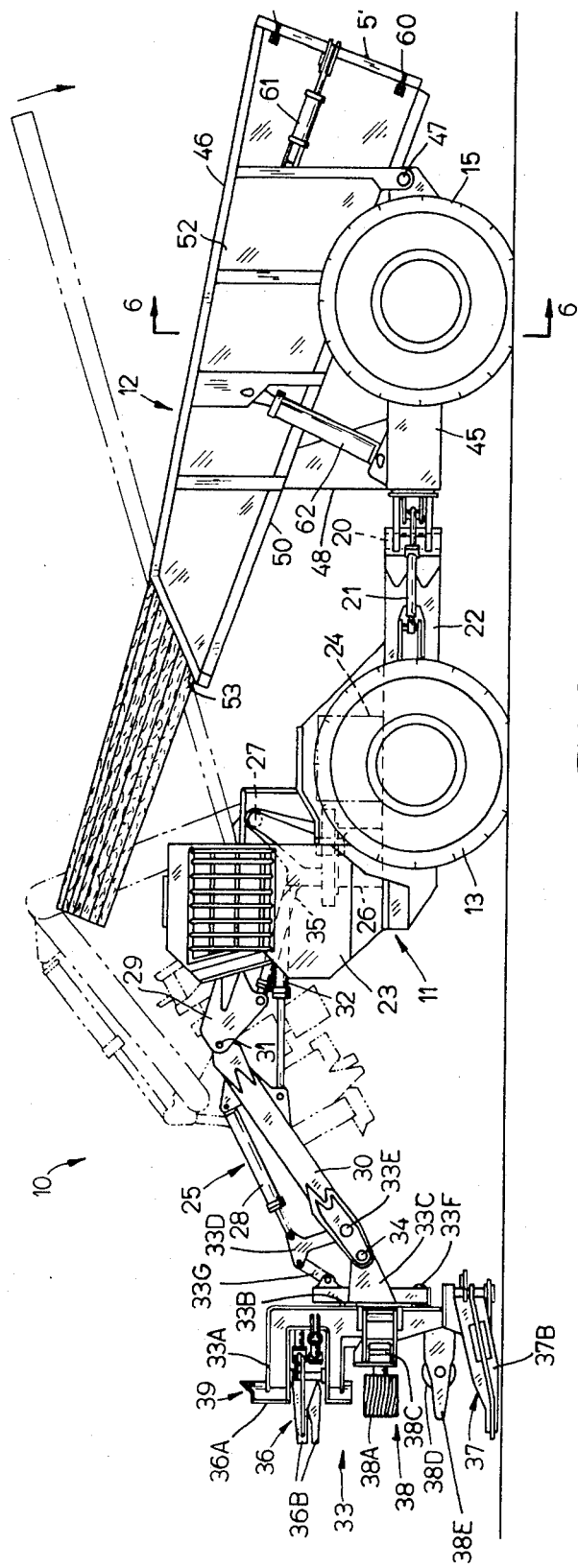
FIG. 2 is a side elevational view of the harvesting machine shown in FIG. 1.

Front unit 11 comprises a chassis 22, right and left rubber-tired power-driven wheels 13 and 14, respectively, on the chassis, an operator's cab 23 mounted on the chassis, and a source of power such as an internal combustion engine 24 (shown in FIG. 2). Engine 24 supplies power for propelling the vehicle and operating a pump (not shown) which supplies hydraulic fluid for operation of various hydraulic cylinders hereinafter described. A boom 25 is mounted on front unit 11 and extends generally forward thereof and tree processing means in the form of a tree boom outer unit 33 is mounted on the working end of the boom, as hereinafter described.

Rear unit 12 comprises a chassis 45, right and left rubber-tired wheels 15 and 16, respectively, on the chassis, and a tree or log accumulating box 46 mounted on the chassis. Extendible hydraulic cylinders such as 21 are pivotally connected to and between the chassis 22 and 45 of the front end rear units 11 and 12, respectively, to assist in steering the vehicle in a known manner.

Boom 25 comprises a rear section 29 and a forward section 30 which is pivotally interconnected to the forward section by a pin 31. Rear boom section 29 is pivotally connected at its lower end by a pin 27 to a yoke 27A which is rotatably mounted on a rigid turret 26 provided on chassis 22 of front unit 11. Yoke 27A is provided with a large externally toothed ring gear 27B which is in continual mesh with a selectively operable motor driven pinion gear 27C. Rotation of pinion gear 27C effects rotation of ring gear 27B to effect horizontal rotation of boom 25 to desired positions.

An extendible and retractable hydraulic type hoist cylinder 35 is pivotally connected to and between yoke 27A and the upper end of rear boom section 29 and operates to raise and lower rear boom section 29.

An extendible and retractable hydraulic type reach cylinder 32 is pivotally connected to and between rear boom section 29 and forward boom section 30 and operates to extend and retract the working end of forward boom section 30.

Tree boom outer unit 33 provided at the working end of forward boom section 29 of boom 25 comprises a supporting frame 33A which is rotatably connected by and around a shaft 33B to a yoke 33C. An extendible and retractable hydraulic type swivel cylinder 33F is pivotally connected to and between yoke 33C and supporting frame 33A of outer unit 33 and operates to rotate frame 33A with respect to yoke 33C. Yoke 33C is pivotally connected by a pin 34 to the working end of forward boom section 30. A crank member 33D is also pivotally mounted on the working end of forward boom section 30 by means of a pin 33E located behind pin 34. A link 33G is pivotally connected to and between yoke 33C and crank 33D. An extendible and retractable hydraulic type tilt cylinder 28 is pivotally, connected to and between forward boom section 30 and crank 33D and operates to rotate outer unit 33 in a vertical plane.

From the foregoing, it is apparent that outer unit 33 on the working end of the boom 25 can be swung to the right or left with respect to vehicle 10, that it can be moved toward or away from the vehicle, that it can be raised and lowered with respect to the vehicle, that is can be rotated (tilted) in a vertical plane with respect to the boom, and that it also can be rotated (swiveled) in a plane normal to the aforesaid vertical plane. The operational sequence of these functions are hereafter described in connection with the description of operation of the tree harvesting machine.

The supporting frame 33A of the tree processing means or tree boom outer unit 33 has several processing devices mounted thereon and in the following description it is to be assumed that unit 33 is disposed in upright (vertical) position, as shown in solid lines in FIGS. 2, 4 and 5. Generally considered, outer unit 33 comprises tree gripping means 36 to releasably grip a tree being harvested and enable rotation to felled position; tree severing means 37; tree propelling means 38 to axially move a severed tree for delimbing and loading; and delimbing means 39 for removing or shearing limbs from the axially moving tree. The severing means 37 are adapted to initially sever an upright tree from its stump, to top it, and in some instances to cut it into several logs.

The tree gripping means 36 comprises two clamping troughs 36A rigidly mounted on Frame 33A near the upper end thereof and into or against which a tree is clamped or squeezed by two clamping arms 36B. The clamping arms 36B are pivotally mounted on frame 33A near the upper end thereof and are operated by two hydraulic type clamp arm cylinders 36C, each pivotally connected to and between frame 33A and its respective clamping arm 36B.

The tree severing means or butt shear 37 comprise two spaced apart shear blades 37A, each disposed on the end of a blade arm 37B which is pivotally mounted on frame 33A near the lower end thereof. The blades 37A are operated by a cylinder 37C and the blade arms 37B are movable toward and away from each other as desired by hydraulic cylinder 37C mounted on the frame in response to the vehicle operator's direction.

The tree or log propelling means 38 comprise two feed rollers 38A which are mounted on frame 33A near the middle thereof and are movable toward and away from each other by means of a hydraulic roll cylinder 38B also mounted on the frame. Each roll 38A, which is cylindrical in form and has a serrated outer surface, is rotatably driven by means of a hydraulic motor 38C mounted on frame 33A behind its roll. A grooved tree guide roll 38D is mounted for free rotation on two support arms 38E rigidly secured to frame 33A. Roll 38D is located between the feed rolls 38A and butt shear 37 and cooperate with the clamping troughs 36A in supporting a tree being processed.

Referring again to the rear unit 12, it is seen that accumulating box 46 is pivotally mounted on chassis 45 by pin means 47 located near the rear of the chassis and box. The front end of box 46 normally rests on a support 48 extending upwardly from chassis 45 and this support gives the box an upward, forward slope. Box 46 comprises a flat floor 50 and inwardly and downwardly sloping sidewalls or members 51 and 52 which cooperate with the floor to define a generally V-shaped trough. Sidewall 51 is provided with an upwardly and outwardly extending extension wall 54. The trough has an opening 53 at its front end but is provided at its rear end with two tailgate doors 57 which are secured near their outer edges to the sidewalls 51 and 52 of box 46 by pivot or hinge means 60. Cylinders 61 are provided to close and open the tailgate doors 57. Box 46 is normally disposed on support 48 on chassis 45 as shown in FIG. 2 so that its front end is higher than its rear end and so that its trough slopes upwardly in the forward direction. Box 45 is shaped and disposed to carry a load of trees or logs so that their lighter narrower ends project upwardly over the front of vehicle 10. Means are provided to elevate the front end of box 46 (and its trough) even higher than shown in FIG. 2 during an unloading operation and such means comprise one or more hydraulic lift cylinders 62 pivotally connected to and between chassis 45 and box 46.

Log directing means are provided near the front end of the trough and are adapted to provide a ledge or surface over which a severed tree or log cut therefrom can tip under the force of gravity and fall into the trough in correct stacking position. In the embodiment shown in FIGS. 1 through 6, the log directing means take the form of a rigid ridge or ledge 55 defined by the intersection of the front edge of extension wall 54 and a small wall surface 54A extending forwardly and downwardly therefrom at the front of box 46. Ledge 55 is located adjacent the open end 53 of the trough, is disposed transversely thereto, and slopes inwardly and downwardly toward the axis of the trough. Thus, when a log is cut from a tree being processed, it tips rearwardly over ledge 55 and rolls or slides down the ledge into the trough, provided its center of gravity is to the rear of the ledge when the log is cut.

SECOND EMBODIMENT

FIGS. 7 through 9 show another embodiment of the machine wherein another type of accumulating box 46A is provided on chassis 45 of vehicle 10. Box 46A comprises two inwardly and downwardly sloped intersecting sidewalls or members 51A and 52A which cooperate to define a log receiving trough. Box 46A comprises a centrally disposed opening 53A at its front end and further comprises front wall surfaces 55A and 55B on either side of the opening and extending forwardly and downwardly from the sidewalls 51A and 52A, respectively. The surfaces 55A and 55B cooperate with the front edges of the sidewalls 51A and 52, respectively, to define ridges or ledges 56A and 56B, respectively, each of which slopes inwardly and downwardly towards the trough. Upwardly and forwardly sloping box 46A differs from box 46 hereinbefore described in that logs can be loaded into box 46A from either side of the vehicle, rather than from only one side as is the case in connection with box 46. Box 46A is rigidly secured to chassis 45 at its rear end and has its front end supported on supports 48A. Box 46A is not, therefore, provided with a hydraulic cylinder such as 62 to effect raising of the front end of the box during an unloading operation.

METHOD OF OPERATION

Figure 1:
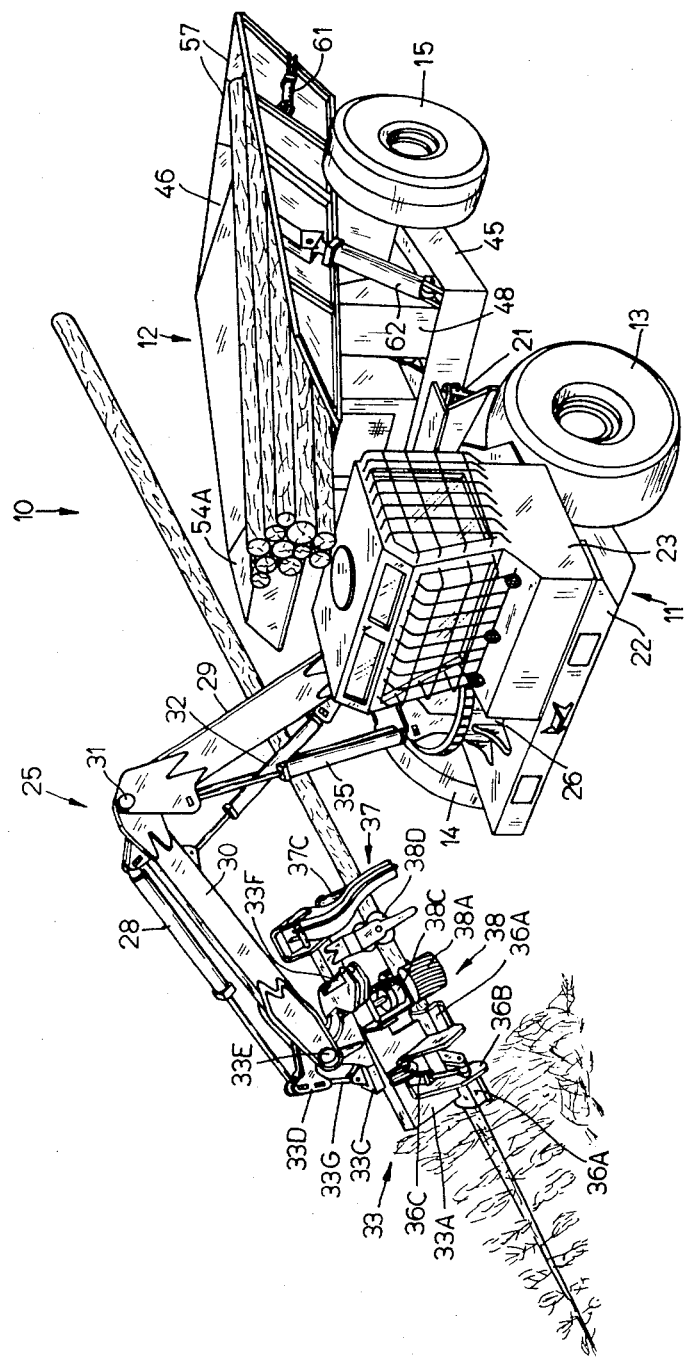
FIG. 1 is a perspective view of the front end and left side of a first embodiment of a tree harvesting machine in accordance with the present invention.
Figure 3:
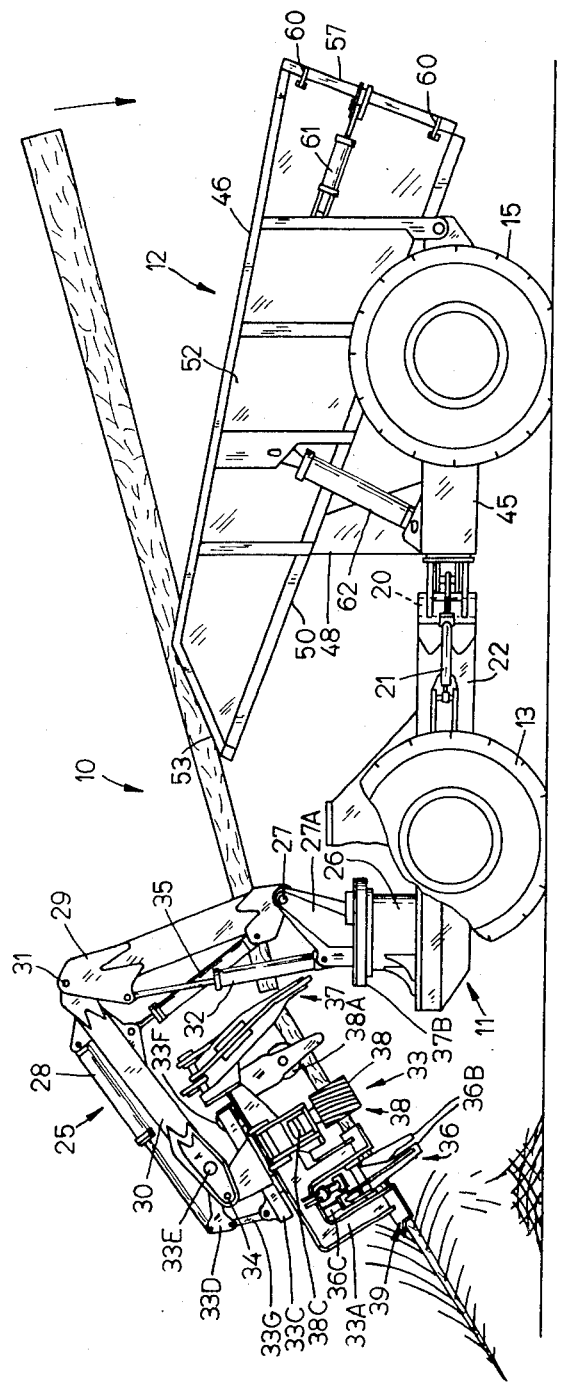
FIG. 3 is a view similar to FIG. 2, but showing the tree processing means of the harvesting machine moved to the delimbing and tree loading position.
Figure 4:
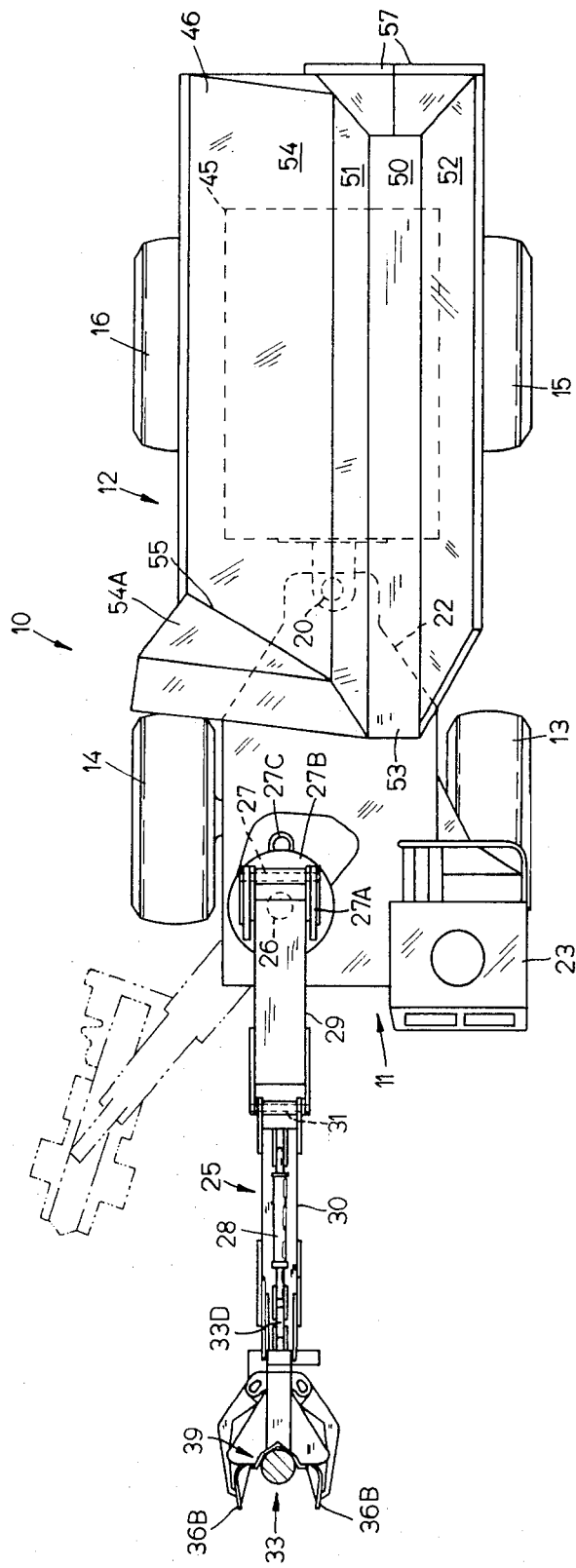
FIG. 4 is a top plan view of the machine shown in FIGS. 1, 2 and 3.
Figure 5:
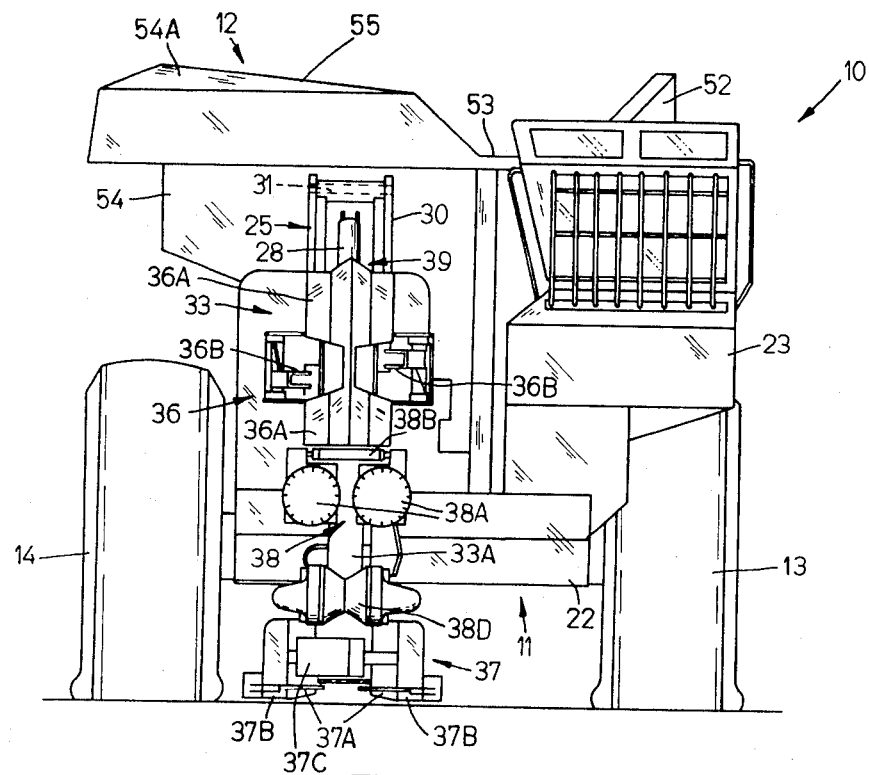
FIG. 5 is an elevational view of the front end of the machine shown in FIGS. 1, 2, 3 and 4.
Figure 6:
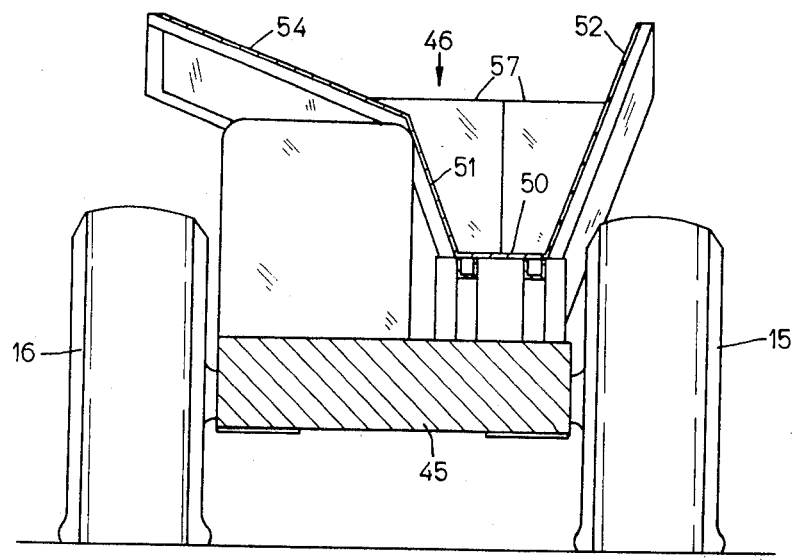
FIG. 6 is a vertical section view of the rear unit of the machine taken along line 6—6 in FIG. 2.

The method of operation of the tree harvesting machine shown in FIGS. 1 through 6 is as follows. Vehicle 10 is driven into a position with respect to a particular tree that is to be harvested so that the tree is ahead of the vehicle (as FIG. 4 shows). The vehicle operator then operates boom 25 to position the tree processing means or boom outer 33 so that it engages the tree. This is accomplished by appropriate operation of hoist cylinder 35, reach cylinder 32, and tilt cylinder 28. The severing means or butt shear 37 is then operated so as to sever the tree from its trunk at a position relatively close to the ground. At the same time, the gripping means 36 are then actuated so as to squeeze or grip the tree into clamp troughs 36A with the clamping arms 36B, using high fluid pressure in the clamp arm cylinder 36C. When the tree is severed, the hydraulic cylinders 32 or 35, or both, are actuated as required so as to move the forward boom section 30 and the rear boom section 29 to lift the tree from its stump and boom 25 is rotated horizontally to swing the tree to the right of the machine (see FIG. 4) until clear of other trees standing in the forest. Simultaneously, the tree processing means or boom outer 33 is rotated vertically with respect to forward boom section 30 by tilt cylinder 28 so as to cause the severed tree to be rotated forwardly (counterclockwise with respect to FIG. 2) into a felled position until the top of the tree is touching the ground and the butt or severed end of the tree is facing the rear of vehicle 10, as FIGS. 1, 2 and 3 show. With the tree gripped in this position, the butt shear 37 is then opened and the pressure on the clamp arms 36B is relaxed to a lower pressure, so that the tree will slide through them. At the same time the feed rolls 38A are closed against the tree trunk, using the roll cylinders 38B. The roll motors 38C are energized, turning the feed rolls 38A to propel the tree towards the machine. The operator uses the hoist 35, reach 32, tilt 28 and swivel 33F cylinders to position the tree boom outer 33 so that the butt end of the tree is directed over the front edge or wing 54A of the log accumulator box 46. At the same time, knife edges 39 at the top of the clamp trough 36A and clamp arms 36B sever the limbs from the trunk.

When a sufficient length of tree has been processed, the operator stops the feed rolls 38A, and severs the log from the tree with the butt shears 37. Since the center of gravity of the log is beyond the ledge 55 of the accumulator box 46, it falls and rolls into the bottom of the box. As this occurs, the heavier butt end of the log is able to tip downwardly over ledge 55 causing the log to roll downwardly along ledge 55 and into box 46. As hereinbefore noted, the shape and disposition of box 46 is such that the log comes to rest in the trough of the box with the narrower end of the log pointing upwardly and with the heavier butt end of the log at rest against the tailgates 57 of box 46.

Depending on the height of the tree, either a whole tree may be so processed or a second and third log may be similarly produced, after which the operator opens the clamp arms 36B, feed rolls 38A and butt shears 37, dropping the top of the tree on the ground. The tree boom outer 33 is then returned to the erect position, and swung and pushed onto the next tree to be harvested. Each tree to be harvested is processed in a manner similar to that hereinbefore described. Again, the shape and and disposition of box 46 and the edge 55 thereof is such that each log will automatically under the force of gravity assume the most desirable stacked position in the box with respect to other logs in the box.

Since the narrower end of the log or logs in box 46 extends upwardly over the cab 23 of vehicle 10, the vehicle 10 may be moved to desired locations in the harvesting area with no possibility of interference between the projecting tree ends and portions of the vehicle. Also, since the upwardly projecting ends of the logs are generally disposed within the confines of the vehicle, interference between loaded logs and standing trees in the harvesting area is also easily avoided. It is to be noted that because boom 25 is movable in several directions, it is possible to harvest several trees without necessarily moving vehicle 10 for each harvesting operation.

When box 46 is fully loaded, vehicle 10 is driven to the appropriate unload area and tailgates 57 of box 46 are opened to enable the logs to slide, butt end first, from the rear of the box 46. If necessary, the front end of box 46 may be raised by the hydraulic cylinder means 62 to facilitate the sliding of the logs from the box 42. If necessary, vehicle 10 may be driven forward or backwards to free the logs from box 46, or components of the vehicle 10, such as boom 25, may be operated to jog the machine to free the logs from box 46.

As explained in the foregoing description of operation, an entire tree may be processed and deposited in box 46 (minus its top), if it is of appropriate length with respect to vehicle size. It is to be understood, however, that apparatus in accordance with the invention may be operated so that a single tree being processed may be severed into logs of desired length by severing means 37 as the tree is being moved over ledge 55 on box 46. It is necessary, however, that the center of gravity of each portion or log to be severed be located past or to the rear of ledge 55 when the severing action occurs in order for the severed portion or log to tip over ledge 55, roll down the ledge 55 and fall into box 46.

The embodiment of the invention disclosed in FIGS. 7, 8 and 9 operates in a manner similar to that hereinbefore described. However, since the trough in box 46A has downwardly and inwardly sloped ledges 56A and 56B on either side of its centrally disposed front opening 53A, the boom 25 and tree processing means 33 can be disposed and used on either side of vehicle 10 during tree harvesting operations. Furthermore, since box 46A is rigidly secured to chassis 45, it is not tilted upwardly during unloading.

RÉSUMÉ

A tree harvesting machine of the articulated vehicle type has a boom-mounted tree-processing means or outer unit 33 on its front end unit 11 and a felled tree accumulating box 46 on its rear end unit 12. The tree-processing means 33 is selectively rotatable on the boom 25 and comprises selectively operable releasable gripping means 36, severing or shear means 37, propelling means 38 and delimbing means 39. The accumulating box 46 comprises an upwardly tilted trough having an opening at its front end and log directing means in the form of one or more downwardly sloped ledges 55 are provided adjacent the open end of the trough. A hydraulically operated tailgate 57 is provided at the rear end of the trough. The forward end of the box 46 is upwardly movable by hydraulic cylinders 62 to increase trough tilt during unloading. In the method of operation, a standing tree is grasped by the gripping means 36, severed from its trunk while upright by shear 37, tipped forwardly to felled position by rotation of the entire unit 33 on boom 25 so that its severed or butt end faces the box 46, and moved axially rearwardly and upwardly by the propelling means 38 over the log directing ledge 55 near the box 46, while the limbs are simultaneously removed by the delimbing means 39. When the center of gravity of that portion of the severed tree which is to be loaded in the box 46 has moved past the ledge 55, the severing means are operated to cut off the said portion of the tree, which portion tips over the ledge 55 and falls into the box 46. The machine and method are usable to harvest entire trees with only the upper end being topped. Or, a tree may be cut into logs of desired lengths as it is moved by the propelling means 38.

We claim:

1. A method for loading a log into an accumulating box comprising the steps of: providing log directing means near an end of said box, said log directing means having a portion over which a log in contact therewith can tip and down which said log can be laterally directed; supporting said log and moving it toward said box over said log directing means until the center of gravity of that portion of said log which is to be deposited in said box is past said log directing means; and releasing said log so that it rests on and pivots about said log directing means and is directed laterally downward thereby into said box by the force of gravity.

2. A method according to claim 1 including the step of delimbing said log while moving it toward said box.

3. A method of loading a log into an accumulating box comprising the steps of: providing log directing means near an end of said box, said log directing means having a portion over which a log in contact therewith can tip and down which said log can be laterally directed; gripping said log and moving it toward said box over said log directing means until the center of gravity of that portion of said log which is to be deposited in said box is past said log directing means; and severing said log at a point located between where it is gripped when severed and said log directing means so that said portion of said log rests on and pivots about said log directing means and is directed laterally downward thereby into said box by the force of gravity.

4. A method according to claim 3 including the step of releasing the remainder of said log after said step of severing.

5. A method according to claim 3 further including the steps of: moving the remainder of said log toward said box over said log directing means until the center of gravity of another portion of said log which is to be deposited in said box is past said log directing means; and severing the remainder of said log at a point located between where it is gripped when severed and said log directing means so that said other portion of said log rests on and pivots about said log directing means and is directed laterally downward thereby into said box by the force of gravity.

6. A method according to claim 5 including the step of releasing the remainder of said log after said step of severing said other portion.

7. A method according to claim 5 including the step of delimbing said log while it is being moved toward said box.

8. A method of harvesting trees and loading logs into an accumulating box comprising the steps of: providing log directing means near an end of said box, said log directing means having a portion over which a log in contact therewith can tip and down which said log can be laterally directed; gripping an upright tree to be harvested; severing said tree from its stump below the place where it is gripped; shifting the severed gripped tree to a position wherein its severed end faces said one end of said box; moving said severed tree toward said box over said log directing means until the center of gravity of that portion of the severed tree which is to be deposited in said box is past said log directing means; and releasing said portion of said tree so that it rests on and pivots about said log directing means and is directed laterally downward thereby into said box by the force of gravity.

9. A method according to claim 8 including the step of delimbing said tree while it is being moved toward said box.

10. A method according to claim 8 wherein the step of releasing includes the step of severing said tree at a point located between where it is gripped when severed and said log directing means so that said portion rests on and pivots about said log directing means and is directed laterally downward thereby into said box by the force of gravity.

11. A method according to claim 10 including the step of delimbing said tree while it is being moved toward said box.

12. A method according to claim 11 including the step of releasing the remainder of said tree after the second step of severing.

13. The method of harvesting standing trees and piling the trees in a container comprising the steps of grasping a standing tree rigidly for support after it has been cut, cutting the tree so as to sever it from its remaining stump, elevating the cut tree bodily upwardly and simultaneously rotating the tree so that the tree is moved with its butt end first with respect to the direction of travel and located over said container, placing the cut tree on an edge of said container so that the center of gravity of the cut tree is located over the container, and then severing the tip of the tree at the end opposite the butt whereby the tree will pivot about the said edge of said container and be directed thereby to drop by gravity into said container.

14. The method set forth in claim 13 including the step of delimbing the tree simultaneously with its movement in a direction toward said container.

* * * * *